Patented June 4, 1946

UNITED STATES PATENT OFFICE 2,401,414

DIENE DIMER

Thomas F. Doumani and Roland Deery, Long Beach, Calif., changed by court order to Roland F. Deering, assignors to Union Oil Company of California, Los Angeles, Calif., a corporation of California No Drawing. Application August 25, 1942, Serial No. 456,036

5 Claims. (Cl. 260—666)

This application relates to the polymerization of doubly unsaturated hydrocarbons such as butadiene, and is a continuation-in-part of our copending application, Serial No. 450,798, filed July 13, 1942.

It is well known that dienes (diolefins) particularly the conjugated dienes, may readily be polymerized to form rubber, resins, and the gums which are so troublesome in cracked gasoline. Our invention resides in our discovery that under certain conditions even in dilute mixtures and those containing mono-olefins, these same dienes may be polymerized practically exclusively to the simplest polymer, namely the dimer, which in the case of butadiene for example, is a relatively stable colorless liquid boiling at about 130° C. Furthermore, invention resides in our discovery that this dimer may be almost quantitatively depolymerized to the original monomer. Invention also resides in the combination of these two steps as a means of concentration of the dienes.

The above discoveries open new fields of chemical utilization, such as the following:

(1) *Separation of dienes from mixtures.*—If for example, in a gaseous mixture containing butanes, butenes and butadiene, the butadiene is selectively dimerized, the remaining gases can be separated from the dimer by a simple fractional distillation or absorption process. Depolymerization of the dimer, followed by a final fractionation if necessary to remove small amounts of products of side reactions, will result in a product consisting of essentially pure butadiene. This process, in contrast to extraction and distillation processes, is readily applicable to mixtures containing as little as 5% or less of the desired diene.

(2) *Utilization of the diene dimers.*—Since the diene dimers are in general relatively stable liquids, they may be shipped and handled more readily than the monomers, which are in some cases gases or very volatile liquids. They may therefore be prepared in a number of plants and shipped to a central depolymerization plant if desired. The dimers may also be utilized as produced in many instances. For example, they may be used for further polymerization, or co-polymerization with other chemicals to form resins, rubber, etc. They are useful also as chemicals or as chemical intermediates. The structure of the butadiene dimer and the equation for its formation may be diagrammed as follows:

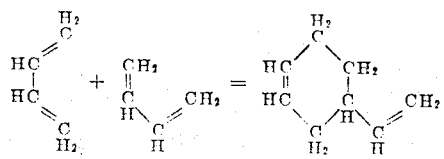

Equations for the formation of the isoprene, cyclopentadiene, and cyclohexadiene dimers follow. For clarity the hydrogen atoms are not shown, but it is understood that a sufficient number of hydrogen atoms are attached to each carbon atom to satisfy its valence of 4.

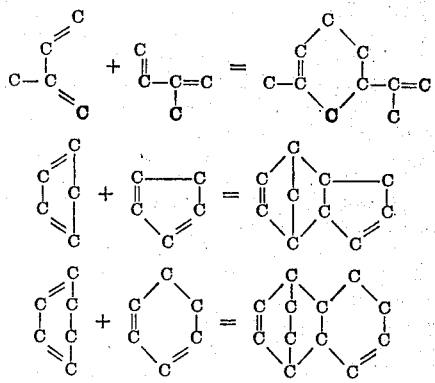

The diagrammatic formulas are so drawn as to make clear the analogous nature of all these reactions.

(3) *Combination processes.*—Since it is possible to depolymerize the diene dimers almost quantitatively to the monomers, it is no longer necessary that existing processes designed to produce the monomers, be operated so as to avoid production of the dimers. For example, production of butadiene by catalytic dehydrogenation of butenes has been carried on preferentially at subatmospheric pressures and temperatures of about 800° F. to 1000° F. to avoid polymerization of the product. It is now possible to operate at slightly higher temperatures and much more favorable pressures of atmospheric or higher, allowing some dimerization to take place, and finally depolymerizing the dimer.

A new field in cracking for the production of the lower boiling dienes, aromatic type hydrocarbons, and/or high octane gasoline is opened up. If high yields of aromatics or dienes are desired, it is now customary to crack hydrocarbon stocks thermally at temperatures of 1200° F. to 2000° F. and pressures far below atmospheric.

According to this invention, such cracking may be carried out at higher pressures, about atmospheric whereby the diene dimers are also formed. The product may then be separated into a fraction boiling below about 65° C. (150° F.) and a higher boiling fraction. The dienes in the first fraction may then be concentrated by dimerizing, fractionating and depolymerizing as described in (1) above. By subjecting the second fraction (which contains all the aromatics) to a depolymerizing operation as described below the dimers present may be depolymerized to monomers. This treatment will concentrate the aromatics also. If stable high octane gasoline is desired, the usual cracked gasoline may be subjected to dimerizing conditions to form more stable dimers or codimers from the more reactive dienes.

Another application of the invention to cracked gasoline production may be used in conjunction with a widely used method of treating cracked gasoline. It is frequently the practice to split the raw, stabilized cracked gasoline into two fractions, a light one boiling below 200° F. to 250° F., and a heavy one boiling above 200° F. to 250° F. The heavy fraction is then given a refining treatment such as acid treatment followed by redistillation, and the light fraction is merely caustic washed to reduce its mercaptan content, since the bulk of the mercaptans, including the more caustic soluble mercaptans, are concentrated in this light fraction. Acid treatment of this light fraction is usually omitted, because it entails loss of mono-olefins, which are of excellent anti-knock rating. This light fraction, however, does contain some of the diene monomers of this invention, and it is a part of this invention to subject such a fraction to dimerizing conditions, fractionating off the dimers, which may be subsequently depolymerized to obtain diene concentrates. This process not only provides for segregation of dienes or dimers, but also improves the gum stability of the light fraction without removing the high octane mono-olefins. In carrying out the combination process of the above paragraphs, the operations should be so designed as to constitute a single correlated unit, affording maximum efficiency of heat utilization with minimum opportunity for undesired side reactions.

The conditions favorable for the dimerization reaction are in general moderate temperatures in the region of 300° C. to 600° C., pressures above about 50 pounds gauge, and moderate contact times of a fraction of a second to several minutes, depending on the concentration of diene in the feed stock, the temperature, and the pressure. The contact time necessary to attain a given degree of conversion decreases with increasing temperature, pressure and concentration of diene in the feed stock, approximately as indicated in the following tabulation.

ture tabulated above is the average temperature of a one-foot section of the hottest portion of the reaction tube, as measured in a concentric thermocouple well. The contact time was calculated for the entire two-foot heated section of the tube, and is therefore somewhat longer than the actual contact time at the indicated temperature. However, the figures shown are illustrative of the order of magnitude of the contact times and their relative values. The contact time required for 30% to 70% conversion increased on the average about 50% for each 10% increase in conversion. The percent conversion was measured by determination of the olefin content of the product gas, assuming that any olefin present was unconverted butadiene. Since it is probable that excessively long time of contact at high temperatures will result in cracking of the feed stock to produce additional olefins, it is probable that the percent conversions determined by the above method are somewhat lower than the actual conversions obtained. This may account in part for the fact that the maximum conversion obtained in any run was about 80%. It probably also accounts for the fact that contact times longer than those required for this maximum conversion caused an apparent decrease in conversion.

Two reaction tubes whose internal diameters were about 3/8 inch and 3/4 inch, respectively, were used in the above work, the larger tube being used for the runs requiring long contact times. It was found that in comparable runs using both tubes, the larger tube in general gave somewhat larger conversions. Both tubes were fitted with 1/4 inch outside diameter concentric thermocouple wells, so their surface to volume ratios were approximately 320 and 96 square foot per cubic foot, for the small and large tube, respectively.

In another series of runs, a small amount of feed stock was measured into the glass liner of a stainless steel bomb; the bomb was immersed in a molten salt bath at the desired temperature for the desired reaction time, observing the pressure generated; and the liquid product recovered after rapidly cooling the bomb was measured and

| Temperature, °C. | Pressure lb. per sq. in. ga. | Diene in feed per cent by wt. | Contact time for 50% conversion, min. | Temperature, °C. | Pressure lb. per sq. in. ga. | Diene in feed per cent by wt. | Contact time for 50% conversion, min. |
|---|---|---|---|---|---|---|---|
| 300 | 50 | 5 | 500 | 500 | 50 | 5 | 1.2 |
| 300 | 50 | 15 | 170 | 500 | 50 | 15 | 0.8 |
| 300 | 50 | 40 | 70 | 500 | 50 | 40 | 0.6 |
| 300 | 250 | 5 | 100 | 500 | 250 | 5 | 0.3 |
| 300 | 250 | 15 | 34 | 500 | 250 | 15 | 0.2 |
| 300 | 250 | 40 | 14 | 500 | 250 | 40 | 0.1 |
| 300 | 1,000 | 5 | 30 | 500 | 1,000 | 5 | 0.06 |
| 300 | 1,000 | 15 | 9 | 500 | 1,000 | 15 | 0.04 |
| 300 | 1,000 | 40 | 4 | 500 | 1,000 | 40 | 0.03 |
| 400 | 50 | 5 | 50 | 600 | 50 | 5 | 0.1 |
| 400 | 50 | 15 | 7 | 600 | 50 | 15 | 0.1 |
| 400 | 50 | 40 | 4 | 600 | 50 | 40 | 0.1 |
| 400 | 250 | 5 | 10 | 600 | 250 | 5 | 0.02 |
| 400 | 250 | 15 | 1.4 | 600 | 250 | 15 | 0.02 |
| 400 | 250 | 40 | 0.8 | 600 | 250 | 40 | 0.02 |
| 400 | 1,000 | 5 | 2.5 | 600 | 1,000 | 5 | 0.01 |
| 400 | 1,000 | 15 | 0.4 | 600 | 1,000 | 15 | 0.01 |
| 400 | 1,000 | 40 | 0.2 | 600 | 1,000 | 40 | 0.01 |

The above data are interpolated and extrapolated from the results of a number of runs, in each of which a mixture of butadiene and normal butane was passed downward under pressure through a mild steel tube, heated by an electric furnace over a two-foot length. Each temperaanalyzed. In these runs also the effects of temperature, pressure, feed composition, and contact time were substantially as indicated in the above tabulation, although of course the contact times were again longer than the true contact times because of the time required to bring the bomb and its contents up to temperature. The surface to volume ratio in this bomb was about 20 square feet per cubic foot. It was found however that the liquid product obtained in the bomb runs was somewhat more pure, i. e., contained less polymer higher than the simple dimer, than was the case in the corresponding tube runs.

Similar runs to those described above, using feed stocks containing butenes in place of or in addition to butanes, showed that the butenes did not interfere with the dimerization of the butadiene, nor did they react to any appreciable extent under the tabulated dimerizing conditions, particularly at temperatures below 500° C. Dilution of the butadiene with inert gases such as steam or flue gases, or with other hydrocarbons also had little effect on the dimerization when carried out under the tabulated conditions. Ethylene, however, could be made to react with the butadiene under conditions of somewhat higher temperature, pressure and contact time than those tabulated. The product of this reaction, cyclohexene, was found to be decomposed predominantly to ethylene and butadiene again under the same conditions used for depolymerizing the dimer, as described below.

Conjugated dienes other than butadiene having less than seven carbon atoms may also be dimerized under the tabulated conditions and the dimers depolymerized as described below.

Analysis of the liquid products from some of the dimerizing tube runs showed that in many instances there were considerable amounts of liquid polymer higher than the dimer present as well as small amounts of solid resinous polymers. It should be noted incidentally that these are included in the "percent conversion" as calculated from the olefin analysis of the product gas. The proportions of these higher polymers and resins increased with increasing degree of conversion to the extent that at the apparent maximum conversion as indicated above, the liquid product consisted of about 50% to 70% dimer, and 30% to 50% higher polymers, of which usually less than 10% was resinous. These higher polymers may be depolymerized to obtain butadiene under the same conditions used for depolymerization of the dimer, but the yields obtained are somewhat lower. It is to be understood however, that where "dimer" and dimerization" are used in this application, unless otherwise indicated, these are to include the associated higher polymers.

In some of the tube runs it was found that resinous products formed a coating which built up on the tube walls during the course of the run. This occurred principally in the runs made at relatively low temperatures and high pressures with feed stocks rich in butadiene, and was markedly worse when the direction of flow was up rather than down through the vertical reaction tube. It was also worse in the runs made with the small tube rather than in the runs made with the large tube, or the bomb runs. This resin formation is objectionable because it destroys butadiene, produces impure dimer, reduces the conversions obtained, and tends to plug the reaction tube.

It is an object of this invention to restrict the proportion of higher polymers and resins in the liquid product, as indicated above. This is accomplished according to this invention by restricting the time of contact at a given temperature and pressure to the minimum required for conversion of less than 90%, preferably between 20% and 70%, and most desirably between 40% and 50%, of the diene in the feed stock, and subjecting the unconverted material to further dimerization.

It is another object of this invention to restrict the formation of resins in the reaction tube, as indicated above. Resin formation may be due to condensation of liquid polymers on the walls of the reaction tube, with subsequent accelerated conversion to solid resins. At any rate, the resin deposition is reduced, according to this invention, by (1) operation at relatively high temperatures, preferably above about 400° C., and relatively low pressures, preferably below about 1000 pounds pressure per square inch gauge, operating at higher temperatures and lower pressures when the feed stock contains higher proportions of diene, (2) employing downward flow through a vertical reactor, and (3) employing reactors having a relatively low surface to volume ratio for example less than 500 square feet per cubic foot and preferably below about 100 square feet per cubic foot, particularly where the surface is mild steel.

It is a further object of this invention to effect more complete conversion of the diene, by employing multistage operation with a higher temperature and the same or higher pressure and the same or longer contact times in each successive stage, preferably although not necessarily removing polymerized material by condensation between stages. The advantages of this mode of operation will be apparent from a study of the above data.

The conditions favorable for depolymerization of the dimer are in general high temperatures in the region of 600° C. to 1000° C., total low pressures or partial pressures, anywhere below atmospheric, attained by vacuum or by the presence of inert gases such as steam, flue gas, etc., and extremely short contact times in the region of about 5 seconds or less, such as down to about 1/100 of a second or possibly less in some cases, using the shorter contact times at the higher temperatures, and in all cases having a very rapid heating to temperatures and extremely rapid quenching to below about 300° C. For example, by passing a mixture of butadiene dimer and water through a stainless steel tube at a temperature of 700° C., a partial pressure of about one-sixth atmosphere, and a contact time of about 3 seconds with only a moderately rapid quench (cooling to below 300° C. in about 0.5 second), the total product gases other than water contained over 80% butadiene, the C₄ fraction itself consisting of about 10% butanes, no butenes, and 90% butadiene. At shorter contact times with a more rapid quench, it is possible to obtain practically quantitative yields of butadiene from the dimer.

It is not necessary to add catalyst either in the dimerization or the polymerization.

The dienes referred to in this invention are in general the conjugated dienes, the doubly bonded carbon atoms being separated by a singly bonded pair of carbon atoms, such as

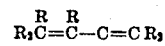

of either cyclic or acyclic structure, and of relatively low molecular weight, i. e., containing less than about 7 carbon atoms. Dienes which are not conjugated are frequently isomerized to the conjugated form under the conditions indicated above for the dimerizing reaction. It is possible to apply the invention therefore also to those non-conjugated dienes which readily isomerize to conjugated dienes, and where "conjugated dienes" are specified in this application these are meant to include those dienes which readily isomerize to the conjugated type under the condition of the reaction in question.

The dienes of this invention boil within the range of about —20° C. to +120° C. (0° F. to 250° F.) The preferred group according to this invention is the group of the simpler, lower boiling ones, consisting of butadiene, isoprene and cyclopentadiene, which boil at about —5° C., 34° C., and 43° C., respectively.

Besides dimerizing the dienes themselves, it is also possible to co-dimerize two or more different conjugated dienes, and to depolymerize the co-dimers again to the simple dienes, using the same general conditions outlined above. Wherever more than one diene is involved in the processes of this application, the word "dimers" shall be construed to include codimers also unless otherwise specified.

It is desirable that the feed stock to be dimerized contain no large amounts of hydrogen or hydrogen sulfide because of possible side reactions, but inert materials such as nitrogen, etc., are not harmful. Thus a wide variety of liquid or gaseous mixtures containing the conjugated dienes of this invention may be "dimerized" and the products may be fractionated to obtain a fraction free from conjugated dienes, and a fraction containing the dimers in concentrated form. From the latter fraction, the concentrated original dienes may be obtained by depolymerization, finally segregating nearly pure individual dienes from the depolymerization product by fractionation. There are many obvious modifications of this and the other processes mentioned in this application which are to be considered parts of the invention as covered by the following claims.

We claim:

1. In a process for converting conjugated dienes containing less than about 7 carbon atoms to their dimers, wherein mixtures containing said dienes together with mono-olefins and other materials not substantially polymerizable under the conditions of treatment are subjected to conditions of elevated temperature and pressure, the improvement which comprises employing downward flow through a vertical reactor having a surface to volume ratio below about 100 square feet per cubic foot which is maintained at a temperature between about 400° C. and 600° C. and a pressure between about 50 and 1000 pounds per square inch gage, with a contact time less than about 5 seconds and sufficient only to attain a maximum conversion of less than about 50% of the dienes present in the feed to dimer, and thereby preventing substantial production of rubbery polymers and dimerizing the dienes without substantially effecting the mono-olefins.

2. A process according to claim 1 in which a series of reaction stages operated at progressively increasing temperature is employed and the contact time in each stage is controlled to obtain less than about 50% conversion to dimer.

3. A process according to claim 1 in which the diene is butadiene.

4. A process according to claim 1 in which the diene is isoprene.

5. A process according to claim 1 in which the diene is cyclopentadiene.

THOMAS F. DOUMANI.
ROLAND DEERY.